Sept. 15, 1936. C. JOHNSON 2,054,464
VALVE
Original Filed Feb. 24, 1933 2 Sheets-Sheet 1

INVENTOR
Clarence Johnson.
BY
ATTORNEY

Sept. 15, 1936.  C. JOHNSON  2,054,464
VALVE
Original Filed Feb. 24, 1933   2 Sheets-Sheet 2

INVENTOR
Clarence Johnson.
BY
Raymond D. Junkins.
ATTORNEY

Patented Sept. 15, 1936

2,054,464

UNITED STATES PATENT OFFICE 2,054,464

VALVE

Clarence Johnson, Cleveland, Ohio, assignor to Bailey Meter Company, a corporation of Delaware Original application February 24, 1933, Serial No. 658,376. Divided and this application May 27, 1933, Serial No. 673,212

11 Claims. (Cl. 137—153)

This invention relates to the art of regulation and provides improvements in control or regulating systems and apparatus. It is primarily concerned with hydraulic, pneumatic or fluid pressure operated systems and of a type wherein a pilot valve positioned or moved by a relatively weak control force, in turn controls the application of fluid pressure for producing or controlling an amplified force whereby useful work is accomplished.

The relatively weak control force for positioning the pilot may be derived from any variable quantity, condition, relation, etc., such, for example, as pressure, temperature, flow, or any physical, chemical, thermal, electrical, hydraulic, or other variable or relation of variables. It is not necessarily limited to positioning by such variables, but the pilot may be positioned by hand or in accordance with any movement to effect an amplified motion or positioning.

The present invention relates particularly to improvements in valves and constitutes a division of my application Serial No. 658,376, filed in the United States Patent Office February 24, 1933, for Control systems. The present invention in connection with improvements in valves was first disclosed and described in said prior patent application as a pilot valve for controlling air under pressure as an actuating fluid in a combustion control system. Herein my description and showing relates primarily to the features of the pilot valve described and illustrated in said prior application but not claimed therein, and I have chosen herein to illustrate and describe one type of control system merely as representative of usage of my improved pilot valve. According to my invention, the deflections of a Bourdon tube, galvanometer, or other device sensitive to the instantaneous magnitude of a variable or to a relation, or to a position, may be utilized to control a fluid pressure system and by suitable fluid pressure actuated devices controlled by the pilot valve so positioned, may provide an amplified force for controlling the operation of dampers, valves, etc. to effect a positioning or a control.

The positioning or control so effected of dampers, valves, or other apparatus, may react to effect the value of the variable which initiated the control, or may not, as desired.

In carrying out my invention in preferred form, I utilize air under pressure as a pressure fluid which is controlled by a pilot valve for positioning pistons or other apparatus. However, it is not necessary that air be used, as water, oil, or other pressure fluids may equally as well be used. I have chosen, however, as a preferred embodiment to illustrate and describe my invention in connection with the usage of air under pressure.

A primary object of the present invention is to provide an improved pilot valve for controlling the pressure fluid.

Another object is to provide a novel design of pilot valve relatively free of friction and having characteristics differing from those in the past known.

Further features of my invention will become apparent from the following description and from the drawings in which.

Figure 1:
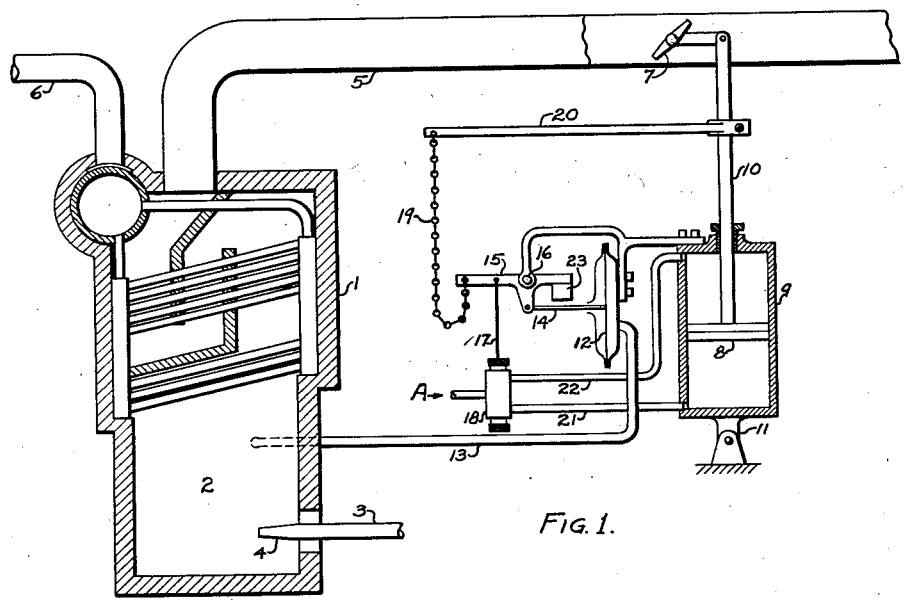
Fig. 1 is a somewhat diagrammatic representation of a vapor generator and a furnace draft control therefor to which the invention has been applied.

Referring first to Fig. 1, I show therein a steam generating boiler 1 having a furnace 2 to which fuel, such as oil, is fed through a pipe 3, and air to support combustion is drawn in around a burner 4. The gaseous products of combustion pass from the boiler through an uptake or duct 5. Steam generated in the boiler passes therefrom through a conduit 6 to any point of usage (not shown).

I desirably control the positioning in the duct 5 of a damper 7 to vary the suction upon the combustion chamber 2, and thereby control the absolute pressure within the furnace or combustion chamber.

For positioning the damper 7 I provide a piston 8 cooperating in a cylinder 9 and having a piston rod 10 connected for movement of the damper. The cylinder 9 and related parts are pivotally supported at 11, as clearly illustrated in the drawings.

For a motive fluid utilized in positioning the piston 8, I use compressed air, although such pressure fluid might easily as well be water, oil, or any desirable and well known type of fluid. At the various points throughout the drawings where air under pressure is available, I indicate the broken ends of said supply pipes by the designation A. I do not feel that it is necessary to show that these various supply points A lead to a compressor or storage tank, or other source of supply, for such is a well known expedient.

I illustrate diagrammatically at 12 a diaphragm properly supported and encased in a manner that (in the drawings) the left hand side of the diaphragm 12 is subjected to atmospheric pressure, while the right hand side of the diaphragm is subjected to an absolute pressure effective through a pipe 13 from a desirable location in the furnace 2. That is, I locate through the wall of the furnace 2 an end of the pipe 13 at any elevation or point in the furnace 2 whereat I desire to maintain a predetermined absolute pressure. This arrangement provides that a differential pressure will be effective upon the diaphragm 12 representative of the absolute pressure at a location within the furnace 2 relative to the pressure of the atmosphere.

Connected to the diaphragm 12 I show a link 14 passing through the diaphragm casing and pivotally joined to a bell crank 15 which is pivotally connected at its elbow on a pivot 16 to a portion of the diaphragm support. Variations in differential pressure effective upon the diaphragm 12 cause a horizontal positioning of the link 14 for angular movement of the bell crank 15.

Suspended from the horizontal arm of the bell crank 15 is a link 17 carrying at its lower end a pilot relative to a pilot casing 18. The pilot assembly is illustrated in greater detail in other figures of the drawings and comprise the principal features of my invention herein claimed. Also carried by the horizontal portion of the bell crank 15 is one end of a chain 19, the other end of which is connected to an arm 20 of the piston rod 10.

The operation is as follows:

Assuming a condition of equilibrium wherein the pressure within the furnace 2 is as desired and the parts substantially as shown in the drawings. Now assume that for some reason the suction within the furnace 2 has increased thereby lowering the absolute pressure. The result is a movement of the diaphragm 12 toward the right, carrying with it the link 14 and positioning the bell crank 15 in a counterclockwise direction around its pivot 16. The pilot stem 17 is lowered in the casing 18. Air from the source A is admitted through a pipe 21 to the cylinder 9 below the piston 8, while air from above the piston 8 is bled through a pipe 22 to the atmosphere. The result is an upward positioning of the piston 8 carrying with it the piston rod 10, the arm 20, and positioning the damper 7 in a closing direction, whereby the effect of the stack upon the uptake 5 is decreased and the suction upon the furnace 2 is decreased.

Simultaneously, the end of the chain 19 fastened to the arm 20 is raised, thus decreasing the weight effective upon the horizontal arm of the bell crank 15. The weight of the chain 19 which is effective upon the bell crank 15, plus the force of the diaphragm upon the bell crank, are opposed by a counterweight 23 of fixed or adjustable value. Thus a decrease in the amount of effective chain 19 through an upward movement of the arm 20 causes the counterweight 23 to be effective in positioning the bell crank 15 in a clockwise direction whereby the pilot is positioned back to its original position and upward travel of the piston 8 is stopped.

For every pressure within the furnace 2 there is a definite position of the piston 8 and damper 7, but the adjustment is such that the range of pressure is extremely small for full travel of the piston and damper, and a substantially constant pressure is maintained. The system comes to a condition of equilibrium for every furnace pressure wherein the amount of weight of the chain 19 effective upon the bell crank 15, plus the differential pressure effective upon the diaphragm 12, is just counterbalanced by the counterweight 23 with the pilot in a neutral position. If such a balance of forces does not exist, then the pilot will not be in its neutral position and the piston 8 will move in one direction or the other, with a resultant change in weight of the chain 19 effective upon the bell crank 15 until such equilibrium does obtain.

At any instant when equilibrium obtains and the pilot is in its neutral position, there is a substantially locked condition of the piston 8, with equal pressures on opposite sides of the piston. When the pilot moves in one direction or the other from its neutral position, then air at a pressure depending upon the amount of movement of the pilot from neutral, is effective upon one side of the piston 8, while air from the other side of the piston is bled to the atmosphere. The particular features and construction of the pilot valve assembly for accomplishing this result will be explained in detail relative to the other figures of the drawings.

Figure 2:
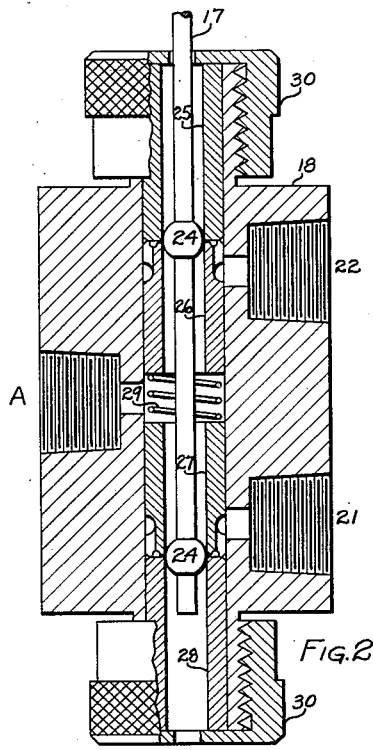
Fig. 2 is a sectional elevation to enlarged scale of the pilot valve of Fig. 1.
Figure 4:
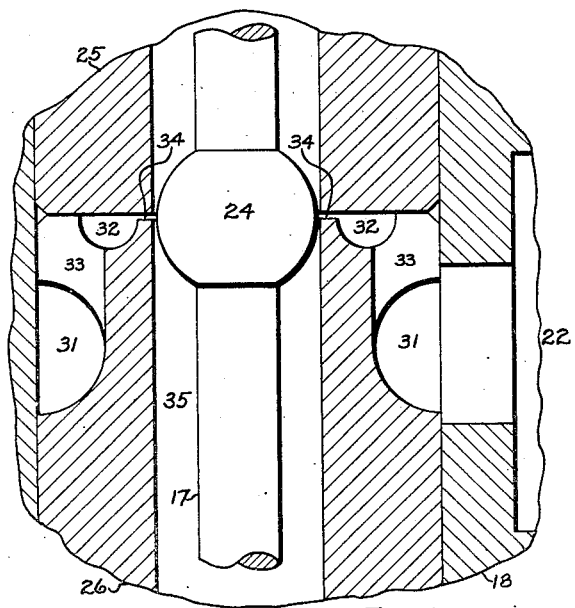
Fig. 4 is an enlarged elevation of a portion of Fig. 2.

I will now describe in detail the functioning and advantages of the pilot of Fig. 1 which I have shown to greatly enlarged scale and in sectional detail at Fig. 2, and a portion of which is shown at still greater scale and detail in Fig. 4.

As is common in this art, the pilot comprises a stem 17 having enlargements 24, known as lands, positioned axially in the pilot casing 18 relative to ports for controlling the passage of a pressure fluid therethrough. Air under pressure is admitted to the interior of the pilot casing 18 from a point of supply A, and the positioning therein of the pilot 17 controls air pressure in the discharge pipes 21, 22. Within the casing 18 is a sleeve surrounding the pilot 17 comprising in the present embodiment, four sleeve sections 25, 26, 27, 28, of substantially the same exterior and interior dimensions placed end-to-end within a central bore of the casing 18. As illustrated clearly in Fig. 2, the sleeve sections 25, 28 are similar, and the sleeve sections 26, 27 are similar. Sections 25, 26 form a pair, as do sections 27, 28, and the two pairs of mating sections are urged apart by the coil spring 29. Over the end of the sections 25, 28 most remote from the center of the casing are screw threaded the caps 30, which tend, when screwed into place, to urge the sections 25, 26 toward the sections 27, 28 against the action of the spring 29. The arrangement allows accurate machining of the sleeves 25, 26, 27, 28 before they are placed within the casing 18, and accurate location of the sleeves within the casing 18 through the arrangement of caps and the compression spring.

It will, of course, be understood that I might equally as well use any of the ports I designate as discharge ports for inlet ports and vice versa. For example, I might in certain systems have ports similar to 21, 22 both connected to a supply A and utilize a single discharge port such as the one shown at the opposite side of the assembly. Furthermore, I might have any number of inlet and outlet ports in the same assembly with appropriate lands as required.

As shown more clearly in Fig. 4, which is an enlarged view of a portion only of Fig. 2, I illustrate the abutting part of the sleeve sections 25, 26.

In construction I preferably make the casing 18 of brass, the sleeve sections 25, 26, 27, 28 of monel, and the lands 24 of Enduro KA₂, or similar material. In clearance between the land or ball 24 and the interior of the sleeve sections I allow something in the nature of .0005 inch. The total axial movement of a pilot, such as 17, may be in the nature of .005 inch.

Referring now specifically to Fig. 4, it will be seen that in the sleeve 26 adjacent the opening 22 is an annular groove 31 cut into the exterior of the section 26. At the upper end (Fig. 4) of the section 26 is an annular groove 32 and communication between the annular grooves 31, 32 is established by one or more openings 33. The upper inner end of the sleeve 26 is relieved at 34, forming a thin annular opening for communication between the interior of the sleeve and the annular opening or passage 32.

The land 24 is shown as spherical, although it may be formed of any desired contour, as will be later explained. This pilot has a number of features which distinguishes it clearly from those pilot valves now known in the art which are generally of a type controlling the quantity of fluid through the related ports, and are usually of a type which must be returned, either through movement of the pilot stem or of the pilot sleeve, to a shutoff position, in order that the functioning of the device as a whole will be accomplished in desired manner. The present pilot is in the nature of a positioning device, giving a definite loading pressure at the ports for each positioning of the pilot, rather than a quantity control of flow through the ports. It may, of course, be utilized in assemblies or constructions wherein it is desirably returned to an original or predetermined neutral position, and such arrangement is illustrated in Fig. 1.

Due to the slight amount of clearance between the greatest diameter of the land 24 and the interior of the sleeve portion, there will be a constant leakage or bleed of air from the supply A around the land and to the atmosphere through the caps 30. With the supply of air admitted between the two lands 24 (Fig. 2) there will be a constant bleed or leakage past each land and thus an entirely balanced condition of pressure relative to the pilot stem 17 wherein no end thrust is produced in either direction. Furthermore, it is a well known principle that a spherical, cylindrical, conical, or similar shape of object, pivoted or held for free movement in a column of flowing fluid, will tend to center itself in the column. Thus, the lands 24 tend to center themselves within the interior of the sleeve portion, allowing substantially uniform leakage at all points of the periphery of the land and providing against possible friction in axial movement of the stem 17, for the fluid bled past the lands serves in the nature of lubrication thereof, which in addition to the fact that the lands are substantially centered, and not touching the walls of the sleeve, prevents friction during axial movement. In reality, the valve member 17 does not touch the sleeve at any point, and therefore is practically frictionless, as well as being, to a certain extent, lubricated by the air bleeding past it at all points of the periphery. Moreover, even though the member should not be properly aligned with respect to the sleeve and was not substantially centered in the column of bleed air, there would actually be nothing but a line contact at the greatest diameter of the land so that the friction would be extremely slight.

With a constant bleed of air past the lands 24 to the atmosphere and full supply pressure at the interior of the sleeve between the lands, there will be a definite gradation of pressure from the space 35, interior of the sleeve 26, and surrounding the stem 17, to the point of least clearance between the lands 24 and the sleeve, namely, the point of greatest diameter of the lands 24.

Surrounding the lands in the shown position is the narrow outlet or discharge port 34 which may be only a few thousandths of an inch in a dimension axial of the assembly. A definite air pressure will exist in the port 34, depending upon the axial positioning of the adjacent land 24 and for every point of such positioning (upward in Fig. 4), until full pressure of the space 35 is effective at 22.

The arrangement is further characterized by the annular port 34 which is employed. Due to the principle of operation that a pressure is picked off along the land 24, the port 34 must be of very small size relative to the land. By having an annular port as shown, the width of the port may be decreased to a very few thousandths of an inch, while the total area for effectiveness of pressure is such width multiplied by the circumference at the point adjacent the land, or a substantial area opening. The annular port of this type has the further advantage in that there is no pressure reaction tending to throw the valve member to one side or the other of the sleeve.

All of these features of the arrangement combine to provide a pilot valve capable of being positioned within its casing with a minimum of effort, as it has substantially a lubricated non-frictional movement with a minimum of end thrust. The control of pressure fluid by the pilot is in the nature of supplying to the port and part under control a pressure accurately depending upon the axial positioning of the pilot within its casing and wherein such pressure-position relation may be definitely controlled by the shaping of the land 24. For example, the land 24 does not need to be spherical in shape but may be of a truncated conical section, such as is illustrated in Figs. 5 and 6.

Figure 5:
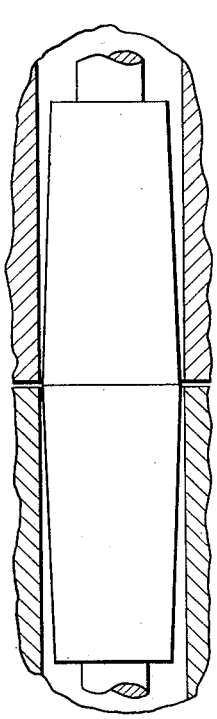
Figs. 5 and 6 are enlarged views of a portion of a pilot valve assembly showing modifications in form of the pilot.
Figure 6:
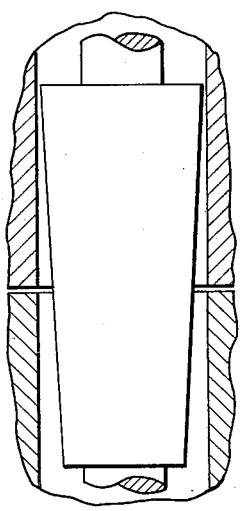

The pilots of Figs. 5 and 6 have the lands greatly elongated in a single direction or both directions from its point of maximum diameter, and with a very slow taper. This provides for a much greater axial movement of the pilot between minimum and maximum possible pressure of the pressure fluid. In other words, rather than a total movement of a few thousandths of an inch, as is desirable with the spherical type of land, the double conical, or single conical type, or one of substantially the same nature, may be designed for a total movement of thirty seconds, or even sixteenths of an inch, or more if desired. Within practical limits, the movement is dependent entirely upon the amount of taper.

Figure 3:
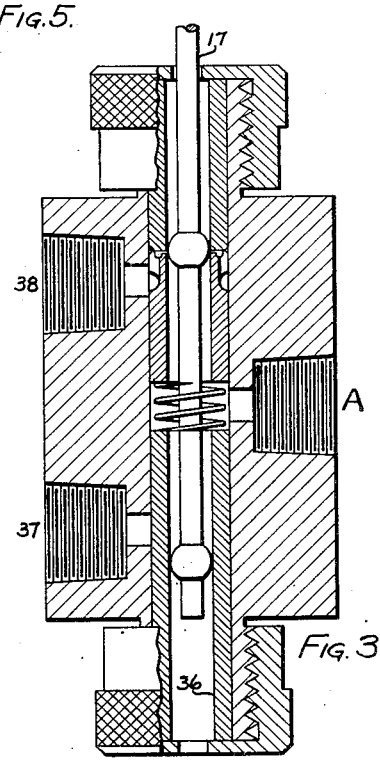
Fig. 3 is a sectional elevation to enlarged scale of a pilot valve.

At Fig. 3 I show an arrangement similar to that of Fig. 2, except that herein I illustrate the sleeve sections 27, 28 replaced by a single sleeve section 36 which serves the purpose of blanking off entrance to the discharge opening 37. I might equally as well have shown this with the blank sleeve 36 at the upper end of the assembly, blanking passage to 38. This arrangement of Fig. 3 allows the control of a pressure fluid to a single outlet without materially changing the parts, or assembly thereof, of the pilot valve as a whole.

The single outlet port pilot is utilized generally in a construction wherein the pilot stem 17 is not always returned to a neutral position following a departure therefrom. It might be utilized in supplying a pressure fluid to a spring loaded diaphragm, piston, or other valve wherein for every pressure applied to the diaphragm or piston, there is an opposing spring force and a definite positioning of the valve.

In general, it may be said that by providing a constant bleed or leakage past the land 24 there is always a pressure gradient along the surface of the land from its maximum to its minimum diameter. Such gradient will be between the pressure of atmosphere and the pressure of supply in the space 35. If, then, the pilot is moved axially relative to the port 34, then the port 34, of very thin annular dimension, will be opposite some point of the pressure gradient dependent upon the amount of axial movement of the pilot. This may be readily seen if we assume that a pressure of air of 50 pounds gage exists in the space 35, and the land 24 has its greatest diameter opposite the ports 34. Referring specifically to Fig. 4, there will be atmospheric pressure upward on the drawings from the land 24, while between the point of greatest diameter of the land and the space 35 there will be a pressure gradient of from atmospheric to 50 pounds gage. If, now, the pilot is moved upward approximately one-half the distance between the shown position and the point where the land 24 merges into the stem 17, then there will be available at the port 34 a pressure approximately 25 pounds. In other words, for every upward movement of the land 24 relative to the port 34, there will be available at the port 34 a pressure of some value between atmospheric and 50 pounds. Thus, by vertical positioning of the pilot, a pressure directly related to such positioning can be applied to the port 34.

While I have illustrated and described the present invention in preferred form and utilized in a single arrangement for control, it is to be understood that the pilot has many uses and may assume other forms, shapes, or arrangements than those which I have illustrated. Furthermore, while I have described the present invention as utilizing air under pressure as a pressure fluid, it may equally as well be considered in connection with the use of oil, water, or any similar fluid which is controlled to provide an amplified power means in novel arrangement. In any event, it is to be understood that the showing is illustrative and that I am to be limited only by the claims in view of prior art.

Certain features of the general arrangement of Fig. 1, are claimed in my copending divisional application Serial No. 82,768.

What I claim as new, and desire to secure by Letters Patent of the United States, is:

1. A pilot valve comprising a casing having a passageway through which fluid continuously flows from a pressure supply, said passageway having an inlet port from the pressure supply, a bleed port to a region of lower pressure, and an outlet port intermediate said inlet and bleed ports, and a restricting means in said passageway adjacent the outlet port affording with the passageway an annular throat through which said fluid continuously bleeds to the region of lower pressure, said restricting means shaped to establish a pressure gradient throughout a portion of its length of a value of from approximately that of the region of lower pressure to approximately that of the supply.

2. A pilot valve comprising a casing having a passageway through which fluid continuously flows from a pressure supply, said passageway having an inlet port from the pressure supply, a bleed port to a region of lower pressure, and an outlet port intermediate said inlet and bleed ports, a restricting means in said passageway adjacent the outlet port affording with the passageway an annular throat through which said fluid continuously bleeds to the region of lower pressure, said restricting means shaped to establish a pressure gradient throughout a portion of its length of a value of from approximately that of the region of lower pressure to approximately that of the supply, and means for moving said restricting means relative to the outlet port to vary the loading pressure available at the said port.

3. A pilot valve comprising a casing having a passageway provided with an inlet port from a fluid pressure supply, a bleed port communicating with a region of lower pressure, and an outlet port intermediate the inlet and bleed ports; and means in said passageway and adjacent said outlet port for restricting the flow of fluid from the inlet port to the bleed port to provide a continuous bleed of fluid through the bleed port to the region of lower pressure and a pressure gradient in said passageway adjacent said outlet port of a value of from approximately that of the region of lower pressure to the approximate pressure of the supply.

4. A pilot valve comprising a casing having a passageway provided with an inlet port from a fluid pressure supply, a bleed port communicating with a region of lower pressure, and an outlet port intermediate the inlet and bleed ports; means in said passageway and adjacent the outlet port for restricting the flow of fluid from the inlet port to the bleed port to provide a continuous bleed of fluid through the bleed port to the region of lower pressure and a pressure gradient in said passageway adjacent said outlet port of a value of from approximately that of the region of lower pressure to the approximate pressure of the supply; and means for moving the restricting means relative to said outlet port to vary the loading pressure available at the said port.

5. A pilot valve comprising a casing having an elongated passageway provided near one end with an inlet port from a fluid pressure supply and having a bleed port near the opposite end communicating with atmosphere, and an annular outlet port located between the inlet and bleed ports; and means in said passageway and adjacent the annular outlet port for restricting the flow of fluid from the inlet port to the bleed port to provide a continuous bleed of fluid through the bleed port to atmosphere and a pressure gradient in said passageway adjacent said annular outlet port of a value of from approximately atmospheric pressure to the approximate pressure of the supply.

6. A pilot valve comprising a casing having a passageway provided with an inlet port from a fluid pressure supply, a bleed port communicating with atmosphere, and an outlet port intermediate the inlet and bleed ports; and means in said passageway adjacent the outlet port for restricting the flow of fluid through the passageway, the surface of said restricting means being spaced from the walls defining the passageway whereby the fluid will continuously leak past the restricting means through the bleed port and to atmosphere to center the restricting means within the passageway and to provide against possible friction between said restricting means and passageway walls, said restricting means being shaped to provide a pressure gradient in said passageway adjacent the outlet port of a value of from approximately atmospheric pressure to the approximate pressure of the supply.

7. A pilot valve comprising a casing having a passageway provided with an inlet port from a fluid pressure supply, a bleed port communicating with atmosphere, and an outlet port intermediate the inlet and bleed ports; a valve within said passageway adjacent the outlet port for restricting the flow of fluid through said passageway, said valve having a maximum diameter slightly less than the diameter of the passageway whereby the fluid will continuously leak past the valve through the bleed port and to atmosphere to center the valve within the passageway and to provide against possible friction between said valve and the walls defining the passageway, said valve tapering from its maximum diameter to a lesser diameter to provide a pressure gradient in said passageway adjacent the outlet port of a value of from approximately atmospheric pressure to the approximate pressure of the supply; and means for moving said valve relative to the outlet port to vary the loading pressure available at the said port.

8. A pilot valve comprising a casing having a cylindrical passageway provided with an inlet port from a fluid pressure supply, a bleed port communicating with atmosphere, and an outlet port intermediate the inlet and bleed ports; a spherical valve member in said passageway and adjacent the outlet port, the maximum diameter of said spherical valve member being slightly less than the diameter of the passageway adjacent the outlet port, whereby the fluid will continuously leak past the valve to atmosphere, the spherical valve providing a pressure gradient in said passageway adjacent the outlet port of a value of from approximately atmospheric pressure to the approximate pressure of the supply; and means for moving said spherical valve relative to said outlet port to vary the loading pressure available at the said port.

9. A pilot valve comprising a casing having a passageway through which fluid flows from spaced inlet and outlet ports extending from said passageway to the exterior of the casing, a valve within said passageway, and means to move the valve to control the flow of fluid through the outlet port, the surface of the valve being spaced from the wall defining the passageway whereby the fluid will continuously leak past the valve to center the same within the passage and to provide against possible friction between the valve and walls defining the passageway, said casing having a bleed port beyond the outlet port to permit continuous escape of said leaking fluid.

10. A pilot valve comprising a casing having a passageway provided with an intermediate inlet port from a fluid pressure supply, bleed ports at opposite ends of the passageway communicating with atmosphere, and spaced outlet ports positioned between the inlet port and each of the bleed ports; a stem passing through said passageway and having spaced land portions thereon, each of said land portions located adjacent one of the outlet ports and adapted to restrict the flow of fluid from the inlet port through the bleed ports to atmosphere, said lands being spaced from the walls defining the passageway whereby the fluid will continuously bleed past the lands and through the bleed ports to atmosphere and said lands shaped to provide a pressure gradient in said passageway adjacent each of the outlet ports of a value of from approximately atmospheric pressure to the approximate pressure of the supply; and means for moving the stem and its land portions relative to the outlet ports to vary the loading pressure available at the said ports.

11. A pilot valve comprising a casing having a passageway provided with an inlet port from a fluid pressure supply, a bleed port communicating with atmosphere, and an outlet port intermediate the inlet port and bleed port; two sleeve sections having a cylindrical interior bore and adapted to fit within the passageway in end to end relation, the outer end of one of said sleeve sections communicating with the inlet port and the outer end of the other sleeve section communicating with the bleed port, the adjacent inner ends of said sleeve sections being slightly spaced to provide a relatively narrow annular discharge opening in communication with the outlet port; and means within said sleeve sections and adjacent the said annular discharge opening for restricting the flow of fluid from the inlet port through the bleed port to atmosphere and shaped to provide a pressure gradient in said sleeve sections adjacent said annular discharge opening of a value of from approximately atmospheric pressure to the approximate pressure of the supply.

CLARENCE JOHNSON.